Feb. 7, 1928.
D. S. JACOBUS
1,658,443
CEMENT KILN SYSTEM
Original Filed Aug. 17, 1916
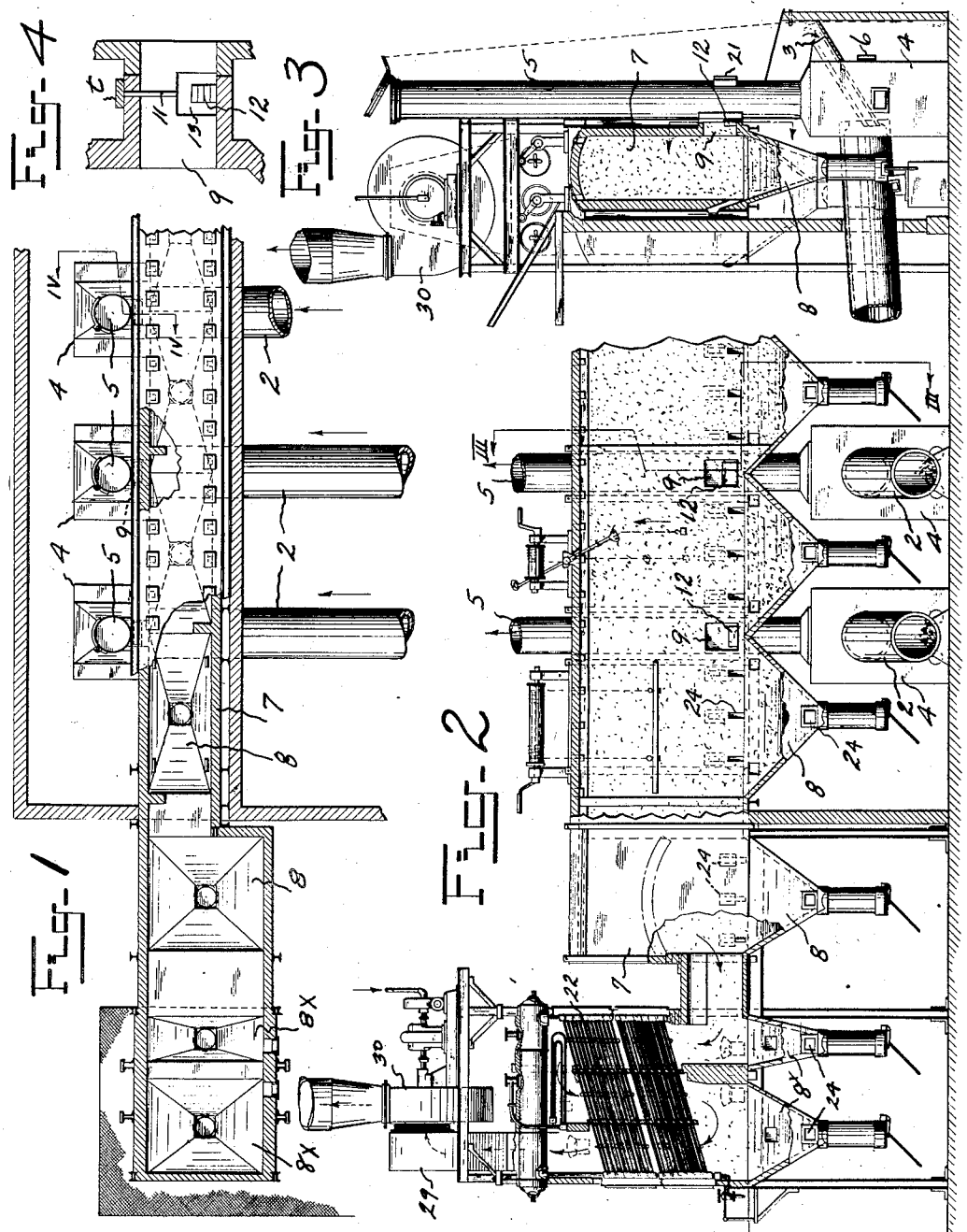
INVENTOR.
David S. Jacobus
BY
Gifford, Bull & Scull
ATTORNEYS.

Patented Feb. 7, 1928.

1,658,443

UNITED STATES PATENT OFFICE.

DAVID S. JACOBUS, OF JERSEY CITY, NEW JERSEY, ASSIGNOR TO THE BABCOCK & WILCOX COMPANY, OF BAYONNE, NEW JERSEY, A CORPORATION OF NEW JERSEY.

CEMENT-KILN SYSTEM.

Original application filed August 17, 1916, Serial No. 115,507. Divided and this application filed January 25, 1923. Serial No. 614,725.

My present invention relates to the regulation of the flow of gases through a plurality of cement kilns connected to a common bus flue which leads, in turn, to a heat-absorbing device, such as a waste heat boiler.

In such systems, as is well understood, the draft drop in each cement kiln is small, so that slight differences in the draft at the gas exits of two adjacent kilns spaced along the common bus flue will result in large differences in the amount of gases passing through such kilns, and therefore large differences in the operation of the two kilns. This difference is increased obviously as the number of kilns spaced along the flue is increased, particularly where the gases lead from the end of the common flue to the heat-absorbing device.

The present application is a division of my Patent No. 1,463,363, issued July 31, 1923.

It is one of the objects of my present invention to overcome this difficulty. Other objects will appear from the following description of a preferred embodiment, in which Fig. 1 is a plan view, partly in section, showing a portion of a cement kiln system with a waste heat boiler and a bus flue connecting the several kilns to the boiler; Fig. 2 is a sectional side elevation of Fig. 1, showing a waste heat boiler and connections thereto; Fig. 3 is a cross-section on the line III—III of the flue part of Fig. 2, and Fig. 4 is an enlarged detail vertical section of the connection between a kiln stack and the common flue on the line IV—IV of Fig. 1.

Like reference characters indicate like parts in the several views.

In the drawings a plurality of cement kilns 2, 2 are arranged in parallel spaced relation, each of the kilns being fed with cement material through the water cooled spouts 3 (Fig. 3). The upper end of each kiln 2 into which the cement-forming material is fed, discharges waste gases in the base portion 4 into an individual stack 5, this base portion having side doors 6 through which the base portion of the stack may be reached for cleaning.

Over the higher ends of the rotary cement kilns 2 extends a common flue 7 having dust-settling hoppers 8 between the kilns. One side of this flue is connected to the cement kiln stacks 5 through openings 9, as shown in detail in Figs. 3 and 4. These openings may be controlled by suitable closure plates or dampers (not shown) movable in slots 11 (Fig. 4). When the kilns are discharging into the flue 7, the dampers in these slots are entirely removed and the slots covered by bricks or tiles $t$; and to regulate the flow of gases from the kilns 2 to the flue 7 and equalize the flow between the various kilns, bricks or tiles may be laid in, as shown at 12. A door 13 (Fig. 4) may be provided for introducing these bricks or tiles.

In order to clean the openings 9 between the furnace stacks and the flue, the stacks may be provided with doors 21, opposite the openings 9, and through which bars may be passed for cleaning off any deposit in the openings. A cleaning device may also be brought into this opening for cleaning off the lower part of the stack. The dust-collecting hoppers 8 may be cleaned by cleaning devices inserted through the side doors 24.

From the bus flue 7, the gases pass into a heat-absorbing device, such as a waste heat boiler 22 of a well-known type, beneath which may be dust-collecting hoppers $8^x$. The gases are drawn through the boiler 22, preferably at high velocity, by a fan 30 connected to the boiler setting by a flue 29.

It will be understood that the connections from the kilns to the common bus flue have a relatively small cross-sectional area for the flow of the gases by which the draft drop at the several kilns may be equalized to a sufficient extent to secure the desired degree of uniformity, no matter what the relation of the several kilns to the waste heat boiler may be. To assist in the equalization, the cross-sectional areas for the flow of the gases may be adjusted once for all, in the illustrative form, by the bricks or tiles 12. These bricks or tiles also provide a certain flexibility in the adjusting means, so that the balancing of the draft through the several kilns may be effected while the kilns are in operation by changing the number of tiles or bricks in each opening 9 through the door 13.

In this manner, all possible variations in the operating conditions may be provided for by varying the amount of closing of the several openings 9 in accordance with the distance of the several kilns from the end of the bus flue and the waste heat boiler.

While I have shown my equalizing arrangement in my preferred form, it will be understood that its embodiment may be widely varied.

I claim:

1. The combination with a plurality of rotary cement kilns arranged in a substantially parallel series, of a horizontally extending flue common thereto, and draft-producing means connected to the common flue beyond the series of rotary cement kilns, the connections between the kilns and the common flue being arranged to equalize the flow of gases through the several kilns irrespective of their relative distances from the draft-producing means.

2. In combination with a plurality of rotary cement kilns arranged in substantially parallel series, of a horizontally extending flue common thereto, a draft-producing means connected to the common flue beyond the set of rotary cement kilns, and connections between the individual kilns and the common flue, at least a plurality of said connections having means associated therewith for regulating the flow of gases through their individual kilns.

3. The combination with a plurality of rotary cement kilns arranged in substantially parallel series, of a common flue extending horizontally and substantially at right angles to said kilns, connections between the individual kilns and the common flue arranged to receive dampers for closing off an individual kiln from said flue, means associated with said connections for regulating the flow of gases through an individual kiln, and a draft-producing means to create a draft through the kilns and the common flue.

4. The combination with a plurality of rotary cement kilns arranged in substantially parallel series, of a common flue extending horizontally and substantially at right angles to said kilns, connections between the individual kilns and the common flue arranged to receive dampers for closing off an individual kiln from said flue, refractories insertable in said connections for regulating the flow of gases through an individual kiln, and a draft-producing means to create draft through the kilns and the common flue.

DAVID S. JACOBUS.